US012629685B2

(12) United States Patent
Isoshima et al.

(10) Patent No.: US 12,629,685 B2
(45) Date of Patent: May 19, 2026

(54) THERMAL CYCLER AND GENETIC INSPECTION APPARATUS

(71) Applicant: Hitachi High-Tech Corporation, Tokyo (JP)

(72) Inventors: Nobuyuki Isoshima, Tokyo (JP); Tatsuya Kobari, Tokyo (JP); Masashi Shibahara, Tokyo (JP); Toshiki Yamagata, Tokyo (JP); Yoko Makino, Tokyo (JP); Wataru Satoh, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 530 days.

(21) Appl. No.: 18/266,055

(22) PCT Filed: Dec. 18, 2020

(86) PCT No.: PCT/JP2020/047536
§ 371 (c)(1),
(2) Date: Jun. 8, 2023

(87) PCT Pub. No.: WO2022/130641
PCT Pub. Date: Jun. 23, 2022

(65) Prior Publication Data
US 2024/0033741 A1 Feb. 1, 2024

(51) Int. Cl.
*B01L 7/00* (2006.01)

(52) U.S. Cl.
CPC ............ *B01L 7/52* (2013.01); *B01L 2200/16* (2013.01); *B01L 2300/0645* (2013.01);
(Continued)

(58) Field of Classification Search
CPC .... B01L 7/52; B01L 2200/16; B01L 2200/12; B01L 2200/147; B01L 2200/0663;
(Continued)

(56) References Cited

U.S. PATENT DOCUMENTS 5,038,852 A * 8/1991 Johnson ............... B01J 19/0046 422/116
6,337,435 B1 * 1/2002 Chu .................. G05D 23/1919 422/550
(Continued)

FOREIGN PATENT DOCUMENTS

JP 2003-332642 A 11/2003
JP 2004279340 A * 10/2004
(Continued)

OTHER PUBLICATIONS

Machine Translation of JP 2004279340 A (Year: 2026).*
(Continued)

*Primary Examiner* — Michael L Hobbs
(74) *Attorney, Agent, or Firm* — Volpe Koenig

(57) ABSTRACT

The present invention provides a thermal cycler capable of rapidly and efficiently heating and cooling a reaction liquid. The thermal cycler according to the present invention comprises: a temperature control block where a reaction vessel can be installed, a thermoelectric conversion unit capable of heating and cooling, a temperature sensor that measures the temperature of the temperature control block, an insulating substrate that is in contact at one surface with the thermoelectric conversion unit, and a heat radiating unit that is provided on the other surface of the insulating substrate and serves for discharging the heat of the thermoelectric conversion unit to the outside, wherein the temperature control block is heated and cooled by controlling a current or voltage supplied to the thermoelectric conversion unit on the basis of the temperature of the temperature adjustment block measured by the temperature sensor.

9 Claims, 13 Drawing Sheets

A–A

(52) U.S. Cl.
CPC .................. *B01L 2300/0663* (2013.01); *B01L 2300/1805* (2013.01); *B01L 2300/1883* (2013.01)

(58) Field of Classification Search
CPC ..... B01L 2300/0645; B01L 2300/0663; B01L 2300/1805; B01L 2300/1883; B01L 2300/12; B01L 2300/1822; B01L 2300/1844; B01L 2300/025; B01L 9/06
See application file for complete search history.

(56) References Cited

U.S. PATENT DOCUMENTS

| | | | | |
|---|---|---|---|---|
| 2004/0241048 | A1 | 12/2004 | Shin et al. | |
| 2005/0006372 | A1 | 1/2005 | Murakami et al. | |
| 2005/0239119 | A1 | 10/2005 | Tsukada | |
| 2008/0003650 | A1 | 1/2008 | Banerji | |
| 2008/0026430 | A1 * | 1/2008 | Sarofim | B01L 7/00 422/307 |
| 2010/0122807 | A1 | 5/2010 | Harttig | |
| 2011/0256616 | A1 * | 10/2011 | Dromaretsky | B01L 7/52 435/286.1 |
| 2011/0312102 | A1 | 12/2011 | Jo | |
| 2017/0211854 | A1 | 7/2017 | Crocco | |

FOREIGN PATENT DOCUMENTS

| | | | |
|---|---|---|---|
| JP | 2005-304445 | A | 11/2005 |
| JP | 2008-035859 | A | 2/2008 |
| JP | 2009-278971 | A | 12/2009 |
| JP | 2009-543064 | A | 12/2009 |
| JP | 2011-115185 | A | 6/2011 |
| WO | 2016/013607 | A1 | 1/2016 |

OTHER PUBLICATIONS

Extended European Search Report issued on Aug. 5, 2024 for European Patent Application No. 20966027.3.
International Search Report, PCT/JP2020/047536, Feb. 22, 2021, 2 pgs.

* cited by examiner

A-A

B-B

A-A

B-B

B-B

THERMAL CYCLER AND GENETIC INSPECTION APPARATUS

TECHNICAL FIELD

The present invention relates to a thermal cycler, and more particularly, to a thermal cycler used for a genetic inspection apparatus.

BACKGROUND ART

Some genetic inspection apparatuses include nucleic acid amplification devices using a polymerase chain reaction (PCR) method. The nucleic acid amplification devices include thermal cyclers to adjust temperatures of reaction liquids in which reagents and samples originated from living bodies extracted from blood, saliva, urine, or the like are mixed.

In the PCR method, a cycle formed by thermal denaturation, annealing, and expansion steps of a nucleic acid is repeated dozens of times to amplify one molecule to millions of molecules. The nucleic acid amplification process is implemented by repeating a temperature adjustment cycle (hereinafter referred to as a "temperature control cycle") at which a temperature of a reaction liquid including a nucleic acid is controlled in a range of, for example, about 65° C. to 95° C. A genetic inspection apparatus is required to have performance capable of accelerating temperature adjustment and shortening a time required to amplify nucleic acids to shorten an inspection time or increasing the number of processes within a predetermined time. Therefore, a technology for heating and cooling a temperature of the reaction liquid at a high speed is required in a thermal cycler used for a genetic inspection apparatus.

A time required to change a temperature of an object is characterized by a heat transfer amount transferred to the object which changes temperature and a heat capacity and thermal conductivity of the object. A thermal cycler used for a general genetic inspection apparatus includes a temperature adjustment block (a temperature control block) in which a reaction vessel where a reaction liquid is input is installed and a thermoelectric conversion module configured by sandwiching an electric circuit (a thermoelectric conversion unit) including a thermoelectric semiconductor and an electrode between insulating substrates. In such a thermal cycler, a temperature of the temperature control block storing a reaction liquid is heated or cooled by adjusting heat generation, heat absorption or joule heating obtained through a thermoelectric conversion action by changing a current or a voltage applied to a thermoelectric conversion module. To accelerate a temperature control cycle, it is necessary to increase a value of a heat transfer amount of heating or cooling and decrease a heat capacity or thermal resistance of an object which changes a temperature.

An example of a thermal cycler according to the related art is disclosed in PTL 1. A supporter for many samples disclosed in PTL 1 includes a block of a unitary structure, a series of sample wells in the block, and a series of hollow portions in the block between the sample wells. A mass of the block is reduced by the hollow portions, a heat capacity is decreased, and a change in temperature is transferred to the samples fast.

CITATION LIST

Patent Literature

PTL 1: JP2009-543064T

SUMMARY OF INVENTION

Technical Problem

As described above, to accelerate a temperature control cycle, in thermal cyclers, it is conceivable that a heat transfer amount of heating or cooling is increased and a heat capacity of an object which changes a temperature is decreased. In thermal cyclers according to the related art, a heat capacity of a temperature control block is dominant in the heat capacity of the object which changes a temperature. In thermal cyclers according to the related art, thermoelectric conversion modules of mass-market products configured with insulating substrates using alumina as a material are used in many cases. Thus, as a reduction of the heat capacity of the temperature control block is in progress, a ratio of the heat capacity caused from the insulating substrates configuring the thermoelectric conversion module has increased considerably in the heat capacity of the object which changes a temperature. Deterioration in a heat transfer amount is unavoidable due to thermal resistance of the insulating substrate and a thermal interface material such as a thermal conductive grease interposed between the temperature control block and the insulating substrate. Therefore, considering a reduction in the heat capacity of the temperature control block, there are needs for a thermal cycler that can heat or cool a reaction liquid rapidly and efficiently. In the thermoelectric conversion module in the thermal cycler according to the related art, repeated thermal strain occurring in a solder junction where a large temperature difference occurs between both surfaces of the thermoelectric conversion module while a temperature control cycle is performed multiple times is one of the reasons to deteriorate a lifespan or performance of apparatuses.

An object of the present invention is to provide a thermal cycler which can heat or cool a reaction liquid rapidly and efficiently and has a long lifespan and provide a genetic inspection apparatus including the thermal cycler.

Solution to Problem

According to an aspect of the present invention, a thermal cycler includes: a temperature adjustment block configured such that a reaction vessel storing a reaction liquid in which a sample and a reagent are mixed is installable; a thermoelectric conversion unit capable of performing heating and cooling; a temperature sensor configured to measure a temperature of the temperature adjustment block; an insulating substrate configured such that one surface contacts with the thermoelectric conversion unit; and a heat radiating unit provided on the other surface of the insulating substrate and configured to discharge heat of the thermoelectric conversion unit to the outside. A current or a voltage supplied to the thermoelectric conversion unit is controlled based on the temperature of the temperature adjustment block measured by the temperature sensor to heat and cool the temperature adjustment block. The thermoelectric conversion unit is sandwiched between the temperature adjustment block and the insulating substrate, and the temperature adjustment block is formed of an electrically insulating material and is installed to be in contact with the thermoelectric conversion unit.

According to another aspect of the present invention, a genetic inspection apparatus includes the thermal cycler and a measurement unit configured to measure a fluorescent property of a reagent solution of which a temperature is adjusted by the thermal cycler.

Advantageous Effects of Invention

According to the present invention, it is possible to provide a thermal cycler which can heat or cool a reaction liquid rapidly and efficiently and has a long lifespan and a genetic inspection apparatus which includes the thermal cycler and can perform inspection in a short time.

DESCRIPTION OF EMBODIMENTS

Figure 1:
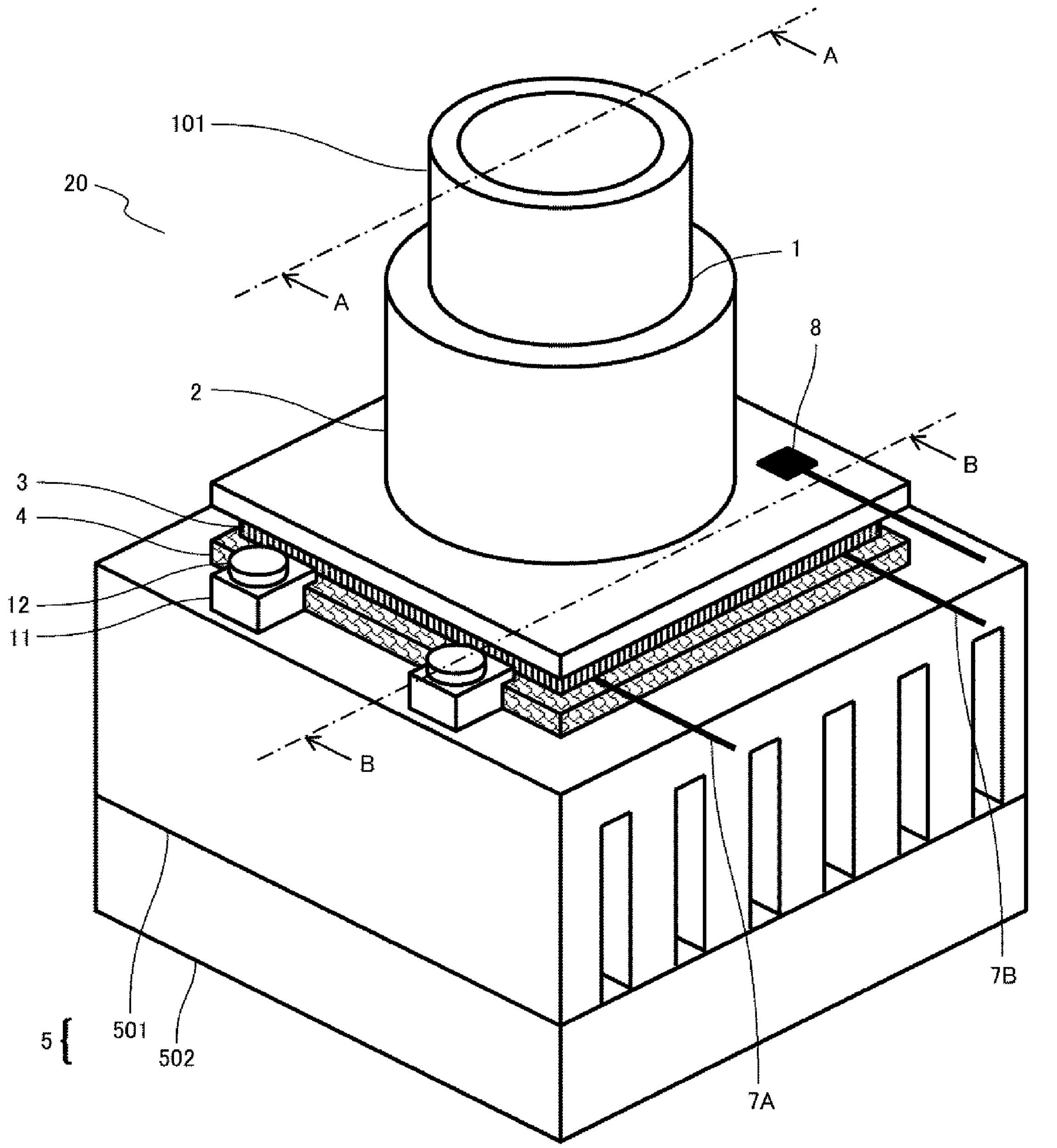
FIG. 1 is a perspective view illustrating an outline of a configuration of a thermal cycler according to an embodiment of the invention.

A thermal cycler according to the present invention can heat or cool a temperature of a reaction liquid rapidly by reducing a heat capacity caused in an insulating substrate configuring a thermoelectric conversion module included in a thermal cycler according to the related art and reducing thermal resistance caused by a thermal interface material such as a thermal conductive grease interposed between a temperature control block and the insulating substrate. A genetic inspection apparatus according to the invention includes the thermal cycler according to the invention.

Hereinafter, a thermal cycler and a genetic inspection apparatus according to an embodiment of the invention will be described with reference to the drawings. In the drawings used in the present specification, the same reference numerals are given to the same or corresponding constituent elements and repeated description of the constituent elements will be omitted in some cases.

Embodiment

A thermal cycler according to the embodiment will be described.

Figure 2:
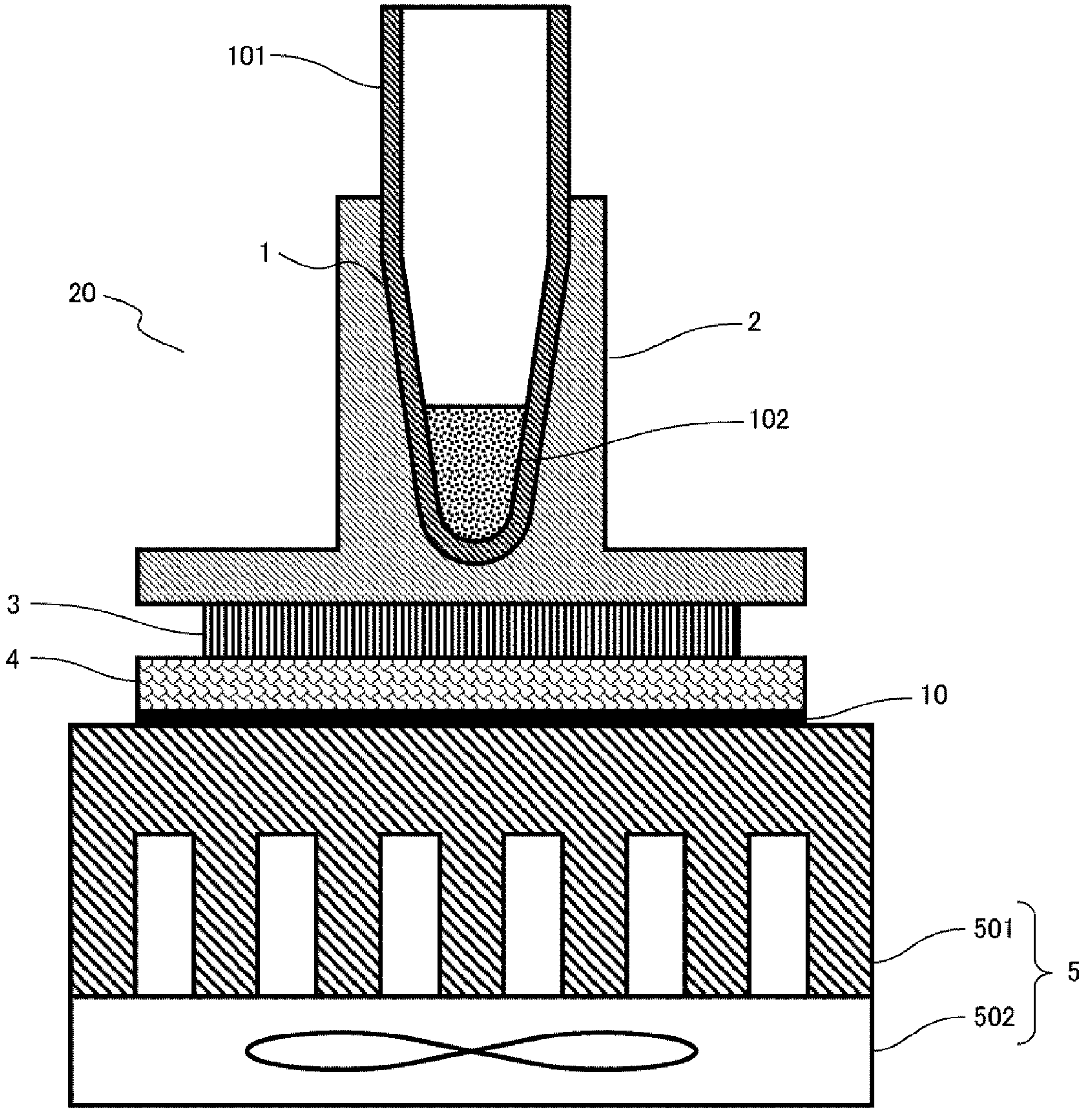
FIG. 2 is a sectional view illustrating the outline of the configuration of the thermal cycler according to the embodiment of the invention.

FIG. 1 is a perspective view illustrating an outline of a configuration of a thermal cycler 20 according to the embodiment of the invention. FIG. 2 is a sectional view illustrating the outline of the configuration of the thermal cycler 20 according to the embodiment of the invention and corresponding to the line A-A of FIG. 1. The thermal cycler 20 includes a temperature adjustment block 2 (hereinafter referred to as a "temperature control block 2"), a thermoelectric conversion unit 3, an insulating substrate 4, and a heat radiating unit 5.

In the temperature adjustment block 2, a reaction vessel 101 that contains a reaction liquid 102 can be installed. The temperature control block 2 may be configured to install the reaction vessel 101 in the recessed portion 1 or may be configured to place the reaction vessel 101 on the surface of the temperature adjustment block 2. In the embodiment, the temperature control block 2 includes the recessed portion 1 where the reaction vessel 101 is installed. The temperature control block 2 is installed to be in contact with the thermoelectric conversion unit 3. The reaction liquid 102 includes a reagent and a sample including a nucleic acid.

Figure 3:
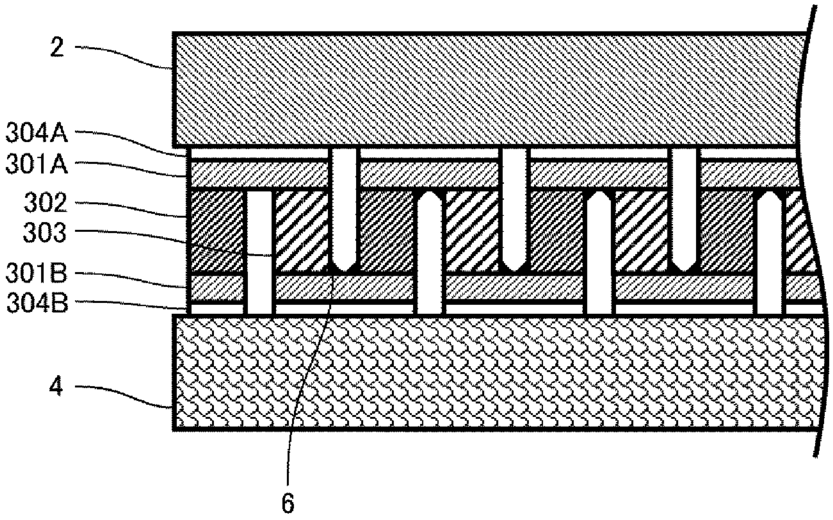
FIG. 3 is a sectional view illustrating an outline of a configuration of a thermoelectric conversion unit according to the embodiment of the invention.

The thermoelectric conversion unit 3 is a temperature adjustment device capable of heating one surface and cooling the other surface by a thermoelectric conversion action and switches between heating and cooling surfaces according to a current flowing direction. Accordingly, the reaction liquid 102 contained in the reaction vessel 101 installed in the temperature control block 2 is heated and cooled. FIG. 3 is a sectional view illustrating an outline of a configuration of the thermoelectric conversion unit 3 in the thermal cycler 20 according to the embodiment of the invention and corresponding to the line B-B of FIG. 1. The thermoelectric conversion unit 3 includes at least electrodes 301A and 301B, a P-type semiconductor element 302, and an N-type semiconductor element 303. A pair of P-type semiconductor element 302 and N-type semiconductor element 303 are electrically connected in series by the electrodes 301. The P-type semiconductor element 302 and the N-type semiconductor element 303 are joined to the electrodes 301 by a solder 6. Lead wires 7A and 7B illustrated in FIG. 1 are connected to the electrodes 301. The thermoelectric conversion unit 3 heats one surface and cools the other surface by applying currents from the lead wires 7A and 7B. The thermoelectric conversion unit 3 can switch between heating and cooling of the reaction liquid 102 according to a direction of the applied current. A value of a current or a voltage applied to the thermoelectric conversion unit 3 is adjusted according to an output of the temperature sensor 8 and the temperature control block 2 is controlled according to a designated temperature.

As a specific structure, a metal plated layer 304A is applied to the surface of the temperature control block 2 and the electrode 301A is mounted on the metal plated layer 304A. On the other hand, a metal plated layer 304B is applied to the surface of the insulating substrate 4 and an electrode 301B is mounted on the metal plated layer 304B. By joining one ends of the N-type semiconductor element 303 and the P-type semiconductor element 302 to the electrode 301A and joining other ends to the electrode 301B, the thermoelectric conversion unit 3 in which the N-type semiconductor element 303 and the P-type semiconductor element 302 are joined alternately and in series is sandwiched between the temperature control block 2 and the insulating substrate 4.

The insulating substrate 4 is installed between the thermoelectric conversion unit 3 and the heat radiating unit 5 to be in contact with the thermoelectric conversion unit 3 and the heat radiating unit 5. One surface of the insulating substrate 4 comes into contact with the thermoelectric conversion unit 3 and the other surface thereof comes into contact with the heat radiating unit 5 to electrically insulate the thermoelectric conversion unit 3 from the heat radiating unit 5 such that thermoelectric conversion can work properly. In many cases, a thermal interface material 10 such as a thermal conductive grease is interposed between the insulating substrate 4 and the heat radiating unit 5 to reduce contact thermal resistance.

The heat radiating unit 5 is provided on the other surface of the insulating substrate 4. When the temperature control block 2 is cooled and a temperature of the heat radiating unit 5 becomes higher than the periphery of the heat radiating unit 5 by applying a current or a voltage to the thermoelectric conversion unit 3, heat from the thermoelectric conversion unit 3 is discharged to the outside. When the temperature control block 2 is heated and the temperature of the heat radiating unit 5 becomes lower than the periphery of the heat radiating unit 5 by reversing the current or the voltage applied to the thermoelectric conversion unit 3, heat is absorbed from the outside. For example, the heat radiating unit 5 includes a heat radiating member 501 (for example, a fin) and a blower 502 and discharges heat from the thermoelectric conversion unit 3 to the outside by conductive heat transfer with the air. The heat radiating unit 5 may have a configuration in which a liquid flows to transfer heat and convey the heat from the thermoelectric conversion unit 3 to the outside.

In the thermal cycler 20 according to the embodiment, the temperature control block 2, the thermoelectric conversion unit 3, and the insulating substrate 4 configure one temperature adjustment module (hereinafter referred to as "temperature control module"). That is, the thermal cycler 20 according to the embodiment includes the temperature control module and the heat radiating unit 5. In the temperature control module, the thermoelectric conversion unit 3 is sandwiched between the temperature control block 2 and the insulating substrate 4, and the temperature control block 2 comes into contact with the electrode 301 of the thermoelectric conversion unit 3.

Here, a thermal cycler according to the related art will be described. In the thermal cycler according to the related art, description of a configuration common with the thermal cycler 20 (FIGS. 1 and 2) according to the embodiment will be omitted.

Figure 4:
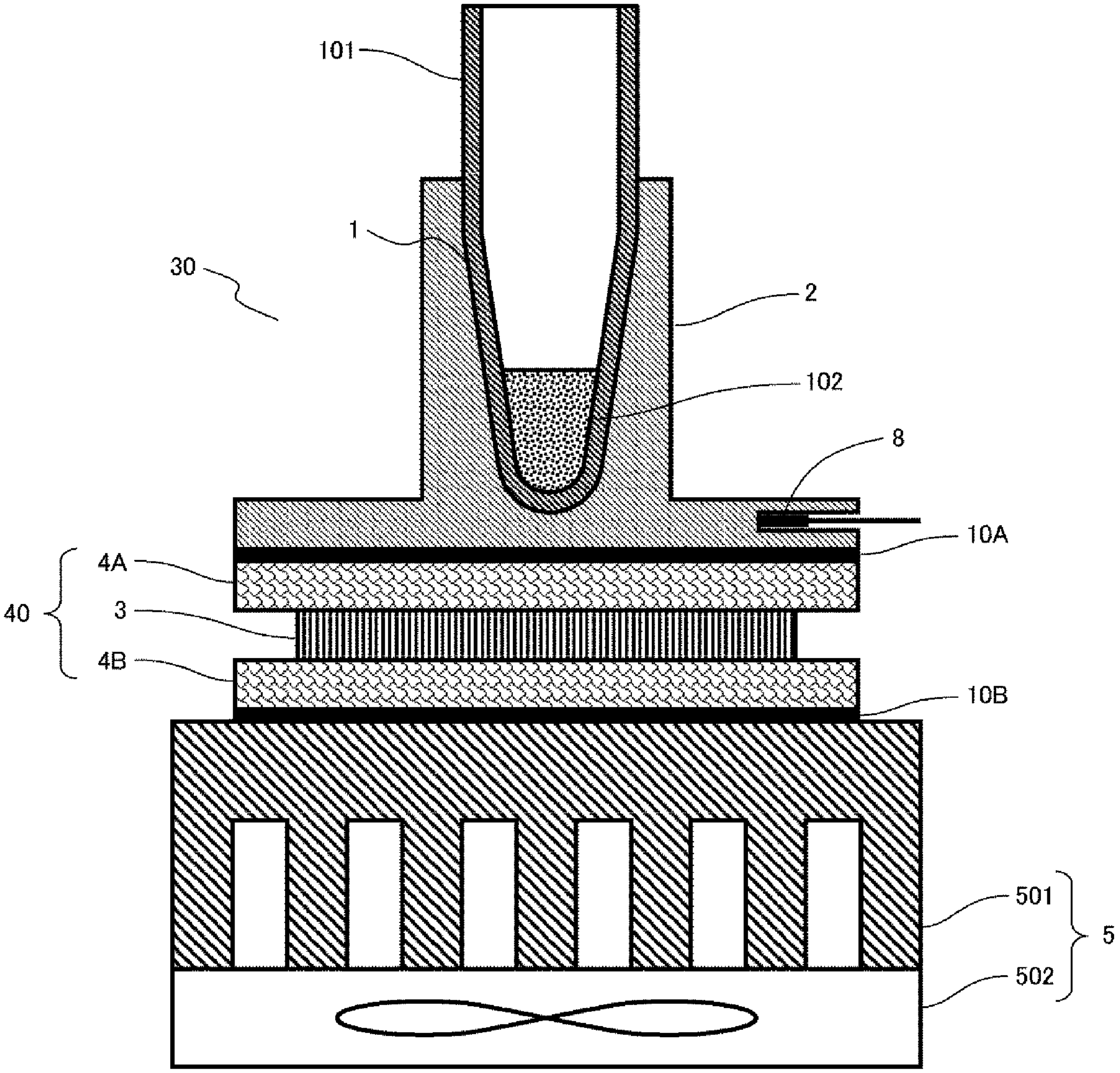
FIG. 4 is a sectional view illustrating an outline of a configuration of a thermal cycler according to the related art.

FIG. 4 is a sectional view illustrating an outline of a configuration of a thermal cycler 30 according to the related art. The thermal cycler 30 includes the temperature control block 2, the thermoelectric conversion unit 3, and two insulating substrates 4A and 4B, and the heat radiating unit 5.

The thermoelectric conversion unit 3 has a structure in which the P-type semiconductor element 302 and the N-type semiconductor element 303 are joined alternately in series with an electrode interposed therebetween, and is sandwiched between the insulating substrates 4A and 4B.

The insulating substrate 4A is installed between the temperature control block 2 and the thermoelectric conversion unit 3 to be in contact with the temperature control block 2 and the thermoelectric conversion unit 3. On the other hand, the insulating substrate 4B is installed between the thermoelectric conversion unit 3 and the heat radiating unit 5 to be in contact with the thermoelectric conversion unit 3 and the heat radiating unit 5. The insulating substrate 4A electrically insulates the temperature control block 2 from the thermoelectric conversion unit 3 and the insulating substrate 4B electrically insulates the thermoelectric conversion unit 3 from the heat radiating unit 5, and thus thermoelectric conversion works properly.

In the thermal cycler 30 according to the related art, the insulating substrate 4A, the thermoelectric conversion unit 3, and the insulating substrate 4B configure an integrally formed thermoelectric conversion module 40 (for example, a Peltier module). That is, the thermal cycler 30 according to the related art includes the temperature control block 2, the thermoelectric conversion module 40, and the heat radiating unit 5. The insulating substrates 4A and 4B of the thermoelectric conversion module 40 are formed in a plate form and sandwich the thermoelectric conversion unit 3 to be a cover of the thermoelectric conversion module 40 that maintains insulation and strength. In the thermal cycler 30 according to the related art, the thermoelectric conversion module 40 of mass-market products formed by the insulating substrates 4A, 4B of alumina is used in many cases in terms of electric property, structure property, price, or the like.

In the thermal cycler 30 according to the related art, the insulating substrate 4A of the thermoelectric conversion module 40 comes into contact with the temperature control block 2 via a thermal interface material 10A such as a thermal conductive grease. Because of a structure in which the insulating substrate 4A is between the temperature control block 2 and the thermoelectric conversion unit 3, both the insulating substrate 4A and the thermal interface material 10A are heated or cooled when the thermoelectric conversion unit 3 heats or cools the temperature control block 2. Accordingly, a heat capacity can be reduced by reducing a volume of the temperature control block 2 to heat or cool a temperature of the reaction liquid 102 rapidly, but a heat capacity corresponding to the insulating substrate 4A and the thermal interface material 10A cannot be reduced. Since the temperature control block 2 and the insulating substrate 4B are individual and independent members, the thermal interface material 10A is generally interposed to reduce contact thermal resistance on an interface between the temperature control block 2 and the insulating substrate 4A. Alumina with electric insulation is generally used in the insulating substrate 4A, but thermal conductivity of alumina is low as about 33 W/(m·K). Therefore, presence of an interface between the insulating substrate 4A, and the temperature control block 2 and the insulating substrate 4 obstructs heat transfer on a heat transfer path reaching from the thermoelectric conversion unit 3 to a reaction liquid.

In the thermal cycler 20 (FIGS. 1, 2, and 3) according to the embodiment, the temperature control block 2, the thermoelectric conversion unit 3, and the insulating substrate 4 configure the temperature control module. The thermal cycler 20 does not include, as an individual member, the insulating substrate 4A (the insulating substrate 4A between the temperature control block 2 and the thermoelectric conversion unit 3) included in the thermal cycler 30 (FIG. 4) according to the related art, and the interface between the temperature control block 2 and the insulating substrate 4A does not exist. Therefore, compared to the thermal cycler 30 according to the related art, it is possible to reduce a heat capacity of the insulating substrate 4A and the thermal interface material 10A from a heat capacity of an object of a heated or cooled temperature control module. Since contact thermal resistance originating from an interface between the temperature control block 2 and the insulating substrate 4A does not occur, a heat transfer amount from the thermoelectric conversion unit 3 to the reaction liquid can be increased. Therefore, in the thermal cycler 20 according to the embodiment, when the thermoelectric conversion unit 3 heats or cools the temperature control block 2, a change in temperature due to the heat capacity of the insulating substrate 4A and the thermal interface material 10A is not delayed as in the thermal cycler 30 according to the related art, and a heat transfer amount from the thermoelectric conversion unit 3 to the reaction liquid can be increased. Therefore, it is possible to shorten a time required to heat or cool the reaction liquid 102.

Figure 5:
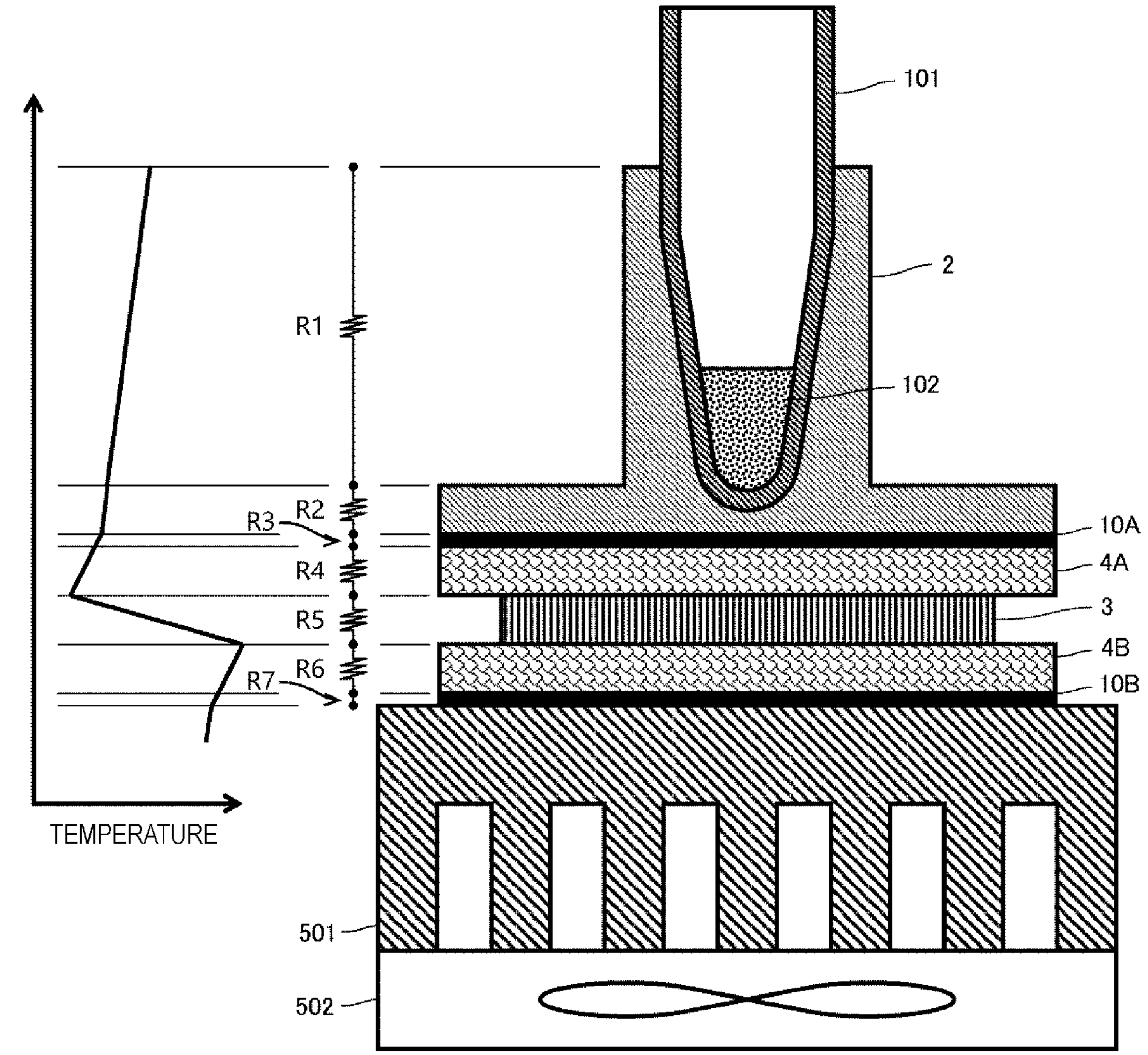
FIG. 5 is a schematic view illustrating an outline of a temperature distribution on a heat transfer path from a tip end of a temperature control block to a heat radiating unit in the thermal cycler according to the related art.

FIG. 5 is a schematic view illustrating an outline of a temperature distribution on a heat transfer path from a tip end of the temperature control block 2 to the heat radiating unit 5 in the thermal cycler 30 according to the related art. R1 indicates a thermal resistance of the recessed portion 1 of the temperature control block 2, R2 indicates a thermal resistance of a flat plate of the temperature control block 2, R3 indicates a contact thermal resistance by the thermal interface material 10A between the temperature control block 2 and the insulating substrate 4A, R4 indicates a thermal resistance of the insulating substrate 4A, R5 indicates a thermal resistance of the thermoelectric conversion unit 3, R6 indicates a thermal resistance of the insulating substrate 4B, and R7 indicates a thermal resistance of the thermal interface material 10B between the insulating substrate 4B and the heat radiating unit 5. An outline of a temperature distribution at the time of applying of a current or a voltage to the thermoelectric conversion unit 3 and cooling the temperature control block 2 is illustrated in the drawing. In the thermal cycler 30 according to the related art, a temperature loss caused by the contact thermal resistance R3 of the thermal interface material 10A and the thermal resistance R4 of the insulating substrate 4A occurs from the upper portion of the thermoelectric conversion unit 3 to the bottom surface of the temperature control block 2.

Figure 6:
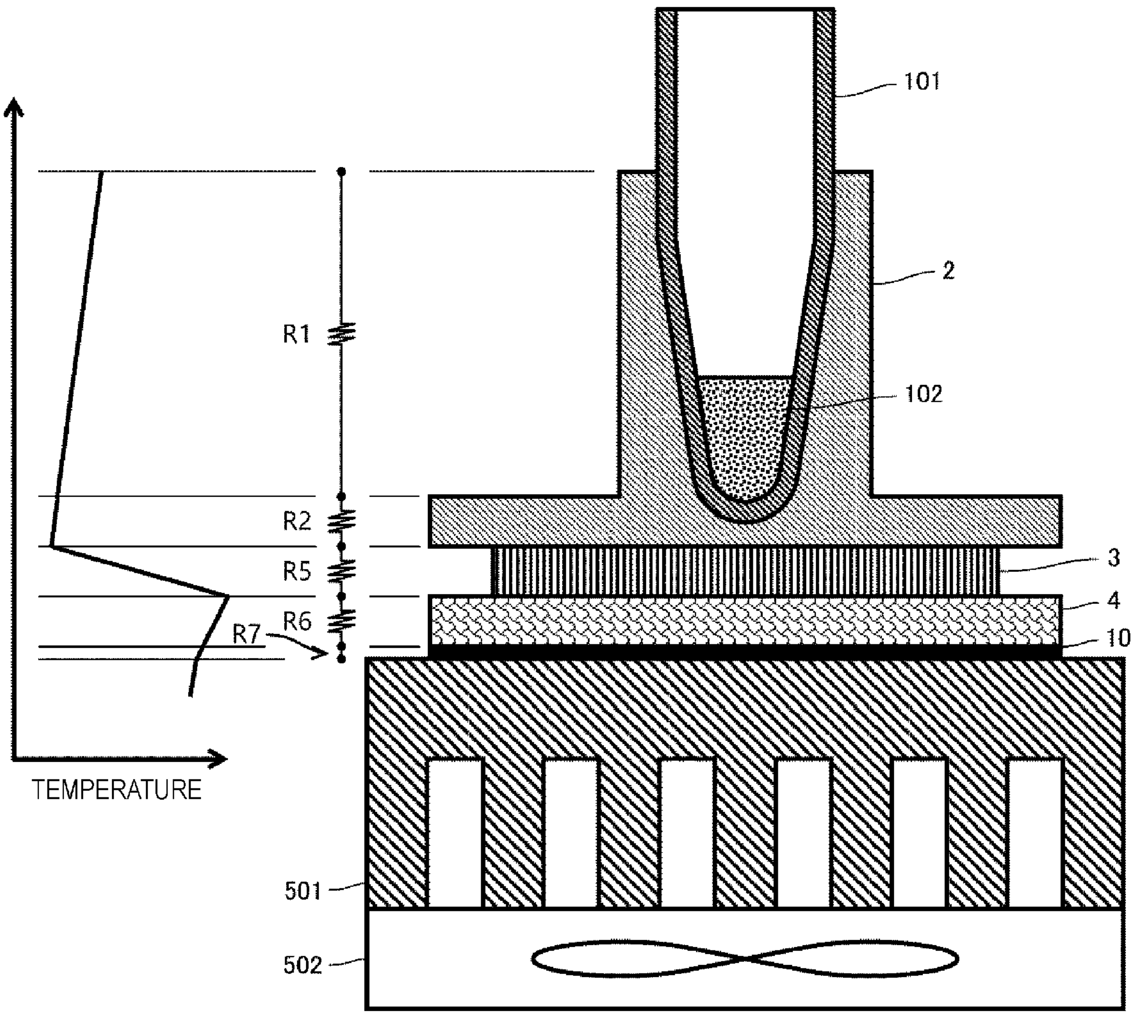
FIG. 6 is a schematic view illustrating an outline of a temperature distribution on a heat transfer path from a tip end of a temperature control block to a heat radiating unit in the thermal cycler according to the embodiment of the invention.

FIG. 6 is a schematic view illustrating an outline of a temperature distribution on a heat transfer path from a tip end of the temperature control block 2 to the heat radiating unit 5 in the thermal cycler 20 according to the embodiment of the invention. In the thermal cycler 20, there is no insulating substrate 4A and no interface between the temperature control block 2 and the insulating substrate 4A. Therefore, a temperature loss caused by the thermal resistances R3 and R4 does not occur and a heat transfer amount can be increased. Thus, it is possible to shorten a time required for heating or cooling.

Figure 7:
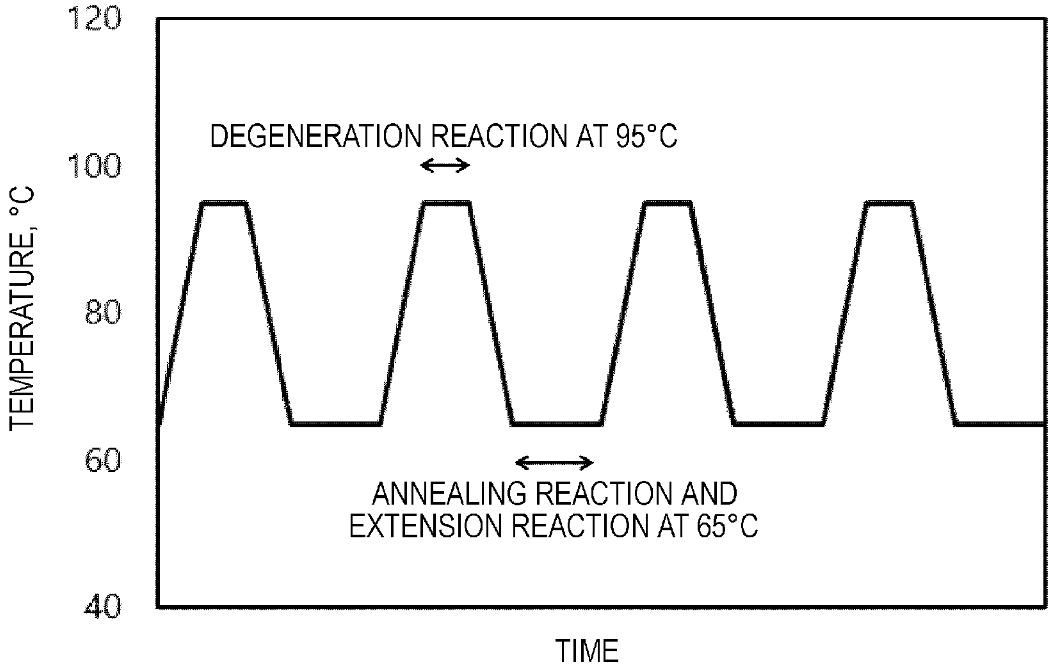
FIG. 7 is a diagram illustrating an example of a temperature control cycle of a PCR method.

FIG. 7 is a diagram illustrating an example of a temperature control cycle in nucleic acid amplification according to a PCR method. In the example, at a temperature control cycle in which a temperature of the temperature control block 2 is changed at ° C. and 65° C., a degeneration reaction for separating two DNA chains to one chain, an annealing reaction for connecting one DNA chain with a primer, and an expansion reaction for duplicating two DNA chains are performed. By repeating the reactions, it is possible to amplify the number of nucleic acids exponentially.

Hereinafter, a preferable material of the temperature control block 2 in the thermal cycler 20 according to the embodiment will be described.

Since the temperature control block 2 comes into direct contact with the electrode 301A of the thermoelectric conversion unit 3, the temperature control block 2 is required to be formed of an electrically insulating material. To adjust a temperature of the reaction liquid 102 rapidly and accurately, a material of the temperature control block 2 preferably has small specific heat and large thermal conductivity.

When a temperature control cycle of the PCR method illustrated in FIG. 7 is performed by the thermoelectric conversion unit 3, a difference in temperature between both surfaces of the thermoelectric conversion unit 3 (a surface coming into contact with the temperature control block 2 and a surface coming into contact with the insulating substrate 4) considerably varies and members (the temperature control block 2 and the insulating substrate 4) sandwiching the thermoelectric conversion unit 3 are thermally expanded and contracted repeatedly. Due to the thermal deformation, stress is repeatedly applied to junctions between the electrode 301 and the semiconductor elements 302 and 303, and thus cracks occur in the solder 6, which is a cause to shorten a lifespan of the thermal cycler 20. Accordingly, the material of the temperature control block 2 preferably has a small coefficient of thermal expansion and small Young's modulus.

From the viewpoint of specific heat, thermal conductivity, and a coefficient of thermal expansion, the temperature control block 2 is preferably formed of an insulating material selected from a group consisting of compounds of carbon, high thermal conductive ceramics, and cermet. In particular, aluminum nitride and boron nitride can be exemplified as strong candidates.

Table 1 shows examples of thermophysical properties of alumina $Al_2O_3$, aluminum alloy A5052, and aluminum nitride AlN. Alumina $Al_2O_3$ is a representative material of the insulating substrate 4A, and the insulating substrate 4B in the thermal cycler 30 according to the related art. Alumina alloy A5052 is used as a representative material of the temperature control block 2 in the thermal cycler 30 according to the related art. Aluminum nitride AlN is ceramics with electric insulation.

TABLE 1

| | Alumina $Al_2O_3$ | Aluminum alloy A5052 | Aluminum nitride AlN |
|---|---|---|---|
| Thermal conductivity W/(m · K) | 33 | 138 | 150 |
| Density kg/m$^3$ | 3984 | 2680 | 3200 |
| Specific heat J/(kg · K) | 755 | 963 | 738 |
| Volume heat capacity J/(m$^3$ · K) | $3.0 \times 10^6$ | $2.6 \times 10^6$ | $2.4 \times 10^6$ |
| Coefficient of thermal expansion 1/K | $7.2 \times 10^{-6}$ | $24 \times 10^{-6}$ | $4.6 \times 10^{-6}$ |

TABLE 1-continued

| | Alumina $Al_2O_3$ | Aluminum alloy A5052 | Aluminum nitride AlN |
|---|---|---|---|
| Young's modulus GPa | 360 | 68 | 320 |
| Coefficient of thermal expansion multiplied by Young's modulus MPa/K | 2.6 | 1.6 | 1.5 |

Aluminum nitride has larger thermal conductivity, and smaller specific heat and coefficient of thermal expansion than alumina and A5052. Aluminum nitride has smaller Young's modulus than alumina. Therefore, the temperature control block 2 included in the thermal cycler 20 according to the embodiment is preferably formed of aluminum nitride.

In thermal expansion and thermal contraction of the temperature control cycle, a load applied to the junctions between the electrode 301 and the semiconductor elements 302 and 303 is considered. Therefore, external force necessary to make thermal strain zero at the time of a change in a temperature of the insulating substrate 4A of the thermal cycler 30 according to the related art was compared with external force necessary to make thermal strain zero at the time of a change in the temperature of the temperature control block 2 of the thermal cycler 20 according to the embodiment. In the comparison between the external forces, calculation in the thermal cycler 20 according to the embodiment and the thermal cycler 30 according to the related art was performed in the following exemplary system.

In the thermal cycler 20 according to the embodiment, the temperature control block 2 was assumed to have a shape including a cylindrical member in the middle of the flat plate. A size of the flat plate has a width, a depth, and a thickness of 15 mm×15 mm×1.2 mm. For simplicity, the recessed portion 1 where the reaction vessel 101 was installed was modeled in a cylindrical shape with an inner diameter of 5 mm, an outer diameter of 6.4 mm, and a height of 7.8 mm. In the thermal cycler 20 according to the embodiment, a material of the temperature control block 2 was aluminum nitride. In the temperature control block 2, an influence of the cylindrical member on thermal strain was neglected. In the thermal cycler 30 according to the related art, the insulating substrate 4A was a flat plate with a size of a width, a depth, and a thickness of 15 mm×15 mm×1.0 mm and the material was alumina.

Table 2 shows calculation results of external force necessary to make thermal strain zero when a temperature is increased by 1° C. in the temperature control block 2 of the thermal cycler 20 according to the embodiment and the insulating substrate 4A of the thermal cycler 30 according to the related art under the foregoing conditions. In the thermal cycler 20 according to the embodiment, external force (external force per unit temperature change) necessary to make thermal strain zero when the temperature of the temperature control block 2 is increased by 1° C. is 26.5 N/K. In the thermal cycler 30 according to the related art, external force necessary to make thermal strain zero when the temperature of the insulating substrate 4A is increased by 1° C. is 38.9 N/K.

TABLE 2

| | Thermal cycler according to related art | Thermal cycler according to embodiment |
|---|---|---|
| External force per unit temperature change of temperature control block 2 N/K | — | 26.5 |
| External force per unit temperature change of insulating substrate 4A N/K | 38.9 | — |

From the calculation result, in the thermal cycler 20 according to the embodiment, the external force necessary to make thermal strain zero when the temperature of the temperature control block 2 is increased by 1° C. is 68% of the external force necessary in the thermal cycler 30 according to the related art, and is less than the external force in the thermal cycler 30 according to the related art. Accordingly, in the thermal cycler 20 according to the embodiment, it is possible to obtain the advantage of reducing a load applied to the junctions of the electrode 301 and the semiconductor elements 302 and 303.

Subsequently, a heat capacity of the temperature control block 2 in the thermal cycler 20 according to the embodiment and a heat capacity of the temperature control block 2 and the insulating substrate 4A in the thermal cycler 30 according to the related art were calculated and obtained for comparison. In the thermal cycler 20 according to the embodiment, an object heated or cooled by the thermoelectric conversion unit 3 is the temperature control block 2. In the thermal cycler 30 according to the related art, an object heated or cooled by the thermoelectric conversion unit 3 is the temperature control block 2 and the insulating substrate 4A.

The temperature control block 2 was assumed to have a shape including, for example, a cylindrical member in the middle of the flat plate in the thermal cycler 20 according to the embodiment and the thermal cycler 30 according to the related art. A size of the flat plate has a width, a depth, and a thickness of 15 mm×15 mm×1.2 mm. For simplicity, the recessed portion 1 where the reaction vessel 101 was installed was modeled in a cylindrical shape with an inner diameter of 5 mm, an outer diameter of 6.4 mm, and a height of 7.8 mm. In the thermal cycler 20 according to the embodiment, a material of the temperature control block 2 was aluminum nitride. In the thermal cycler 30 according to the related art, the insulating substrate 4A was a flat plate with a size of a width, a depth, and a thickness of 15 mm×15 mm×1.0 mm, the material of the temperature control block 2 was A5052, and the material of the insulating substrate 4A was alumina.

Table 3 shows calculation results of a heat capacity of the temperature control block 2 of the thermal cycler 20 according to the embodiment and a heat capacity of the temperature control block 2 and the insulating substrate 4A of the thermal cycler 30 according to the related art under the foregoing conditions. In the thermal cycler 20 according to the embodiment, a heat capacity of an object (the temperature control block 2) heated or cooled by the thermoelectric conversion unit 3 is 0.87 J/K. In the thermal cycler 30 according to the related art, a heat capacity of an object (the temperature control block 2 and the insulating substrate 4A) heated or cooled by the thermoelectric conversion unit 3 is 1.63 J/K. Accordingly, in the thermal cycler 20 according to the embodiment, the heat capacity of an object heated or cooled by the thermoelectric conversion unit 3 is about 53% of the heat capacity in the thermal cycler 30 according to the related art and is less than the heat capacity of the thermal cycler 30 according to the related art. Therefore, the thermal cycler 20 according to the embodiment can heat or cool the reaction liquid 102 more rapidly than the thermal cycler 30 according to the related art.

TABLE 3

| | Thermal cycler according to related art | Thermal cycler according to embodiment |
|---|---|---|
| Heat capacity of temperature control block 2 J/K | 0.95 | 0.87 |
| Heat capacity of insulating substrate 4A J/K | 0.68 | — |
| Sum of heat capacities J/K | 1.63 | 0.87 |

Subsequently, an overall thermal resistance from the thermoelectric conversion unit 3 to the tip end of the temperature control block 2 was calculated and obtained in the thermal cycler according to the embodiment and the thermal cycler 30 according to the related art. An overall thermal resistance in the thermal cycler 20 according to the embodiment is a thermal resistance of the temperature control block 2. An overall thermal resistance in the thermal cycler 30 according to the related art is a sum of the thermal resistance of the temperature control block 2, the thermal resistance of the insulating substrate 4A, and the contact thermal resistance on the interface between the temperature control block 2 and the insulating substrate 4A.

The thermal resistance of the temperature control block 2 in the thermal cycler 20 according to the embodiment is a sum of R1 and R2 in FIG. 6. The thermal resistance of the temperature control block 2 in the thermal cycler 30 according to the related art is a sum of R1, R2, R3, and R4 in FIG. 5.

The overall thermal resistance of the thermal cycler 20 according to the embodiment and the overall thermal resistance of the thermal cycler 30 according to the related art were calculated under the same conditions as the conditions when the heat capacities shown in Table 3 were obtained. Here, in the thermal cycler 30 according to the related art, the thermal interface material is interposed between the temperature control block 2 and the insulating substrate 4A, and thus the contact thermal resistance was assumed to be $10^{-6}$ ($m^2$·K)/W.

Table 4 shows calculation results of the thermal resistance of the temperature control block 2 in the thermal cycler 20 according to the embodiment, the thermal resistance of the temperature control block 2 in the thermal cycler 30 according to the related art, the contact thermal resistance on the interface between the temperature control block 2 and the insulating substrate 4A, and the thermal resistance of the insulating substrate 4A under the foregoing conditions. Table 4 shows overall thermal resistances in the thermal cycler 20 according to the embodiment and the thermal cycler 30 according to the related art. In the thermal cycler 20 according to the embodiment, the overall thermal resistance is 4.2 K/W. In the thermal cycler 30 according to the related art, the overall thermal resistance is 4.6 K/W. Accordingly, in the thermal cycler 20 according to the embodiment, the overall thermal resistance from the thermoelectric conversion unit 3 to the tip end of the temperature control block 2 is about 90% of the overall thermal resistance in the thermal cycler 30 according to the related art and is less than the overall thermal resistance in the thermal cycler 30 according to the related art. Therefore, the thermal cycler 20 according to the embodiment can heat or cool the reaction liquid 102 efficiently and rapidly.

TABLE 4

| | Thermal cycler according to related art | Thermal cycler according to embodiment |
|---|---|---|
| Thermal resistance of temperature control block 2 K/W | 4.5 | 4.2 |
| Contact thermal resistance between temperature control block 2 and insulating substrate 4A K/W | 4.4 x $10^{-3}$ | — |
| Thermal resistance of insulating substrate 4A K/W | 0.13 | — |
| Overall thermal resistance K/W | 4.6 | 4.2 |

Figure 8:
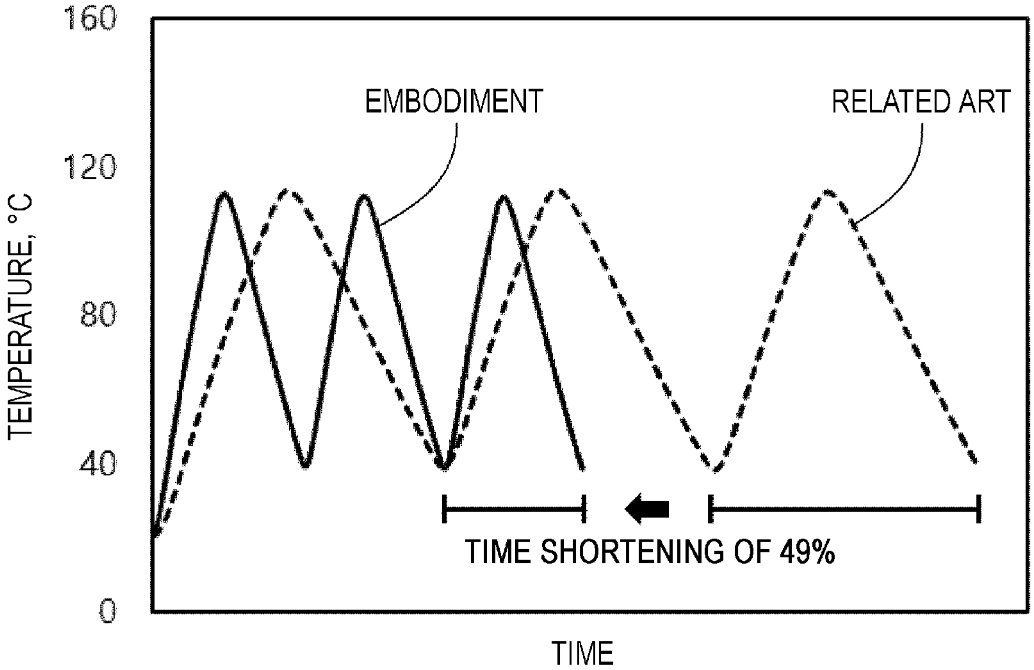
FIG. 8 is a diagram illustrating comparison between numerical value calculation results obtained by comparing heating or cooling speeds between the thermal cycler according to the embodiment of the invention and the thermal cycler according to the related art.

FIG. 8 is a diagram illustrating comparison between numerical value calculation results obtained by comparing heating or cooling speeds between the thermal cycler 20 according to the embodiment of the invention and the thermal cycler 30 according to the related art. The horizontal axis of the drawing represents time and the vertical axis represents temperature of the temperature control block 2. A solid line indicates a result of the thermal cycler 20 according to the embodiment of the invention and a dotted line indicates a result of the thermal cycler 30 according to the related art. In the numerical calculation, an initial temperature of the temperature control block 2 was set to 21° C. and a heating and cooling simulation in which a course from an increase in the temperature until about 105° C. to a decrease until about 40° C. was repeated three times was performed. When the results of the third heating and cooling course were compared, it was understood that it is possible to obtain the advantage of shortening a required time in the thermal cycler 20 according to the embodiment by 49% of a required time in the thermal cycler 30 according to the related art.

Figure 9:
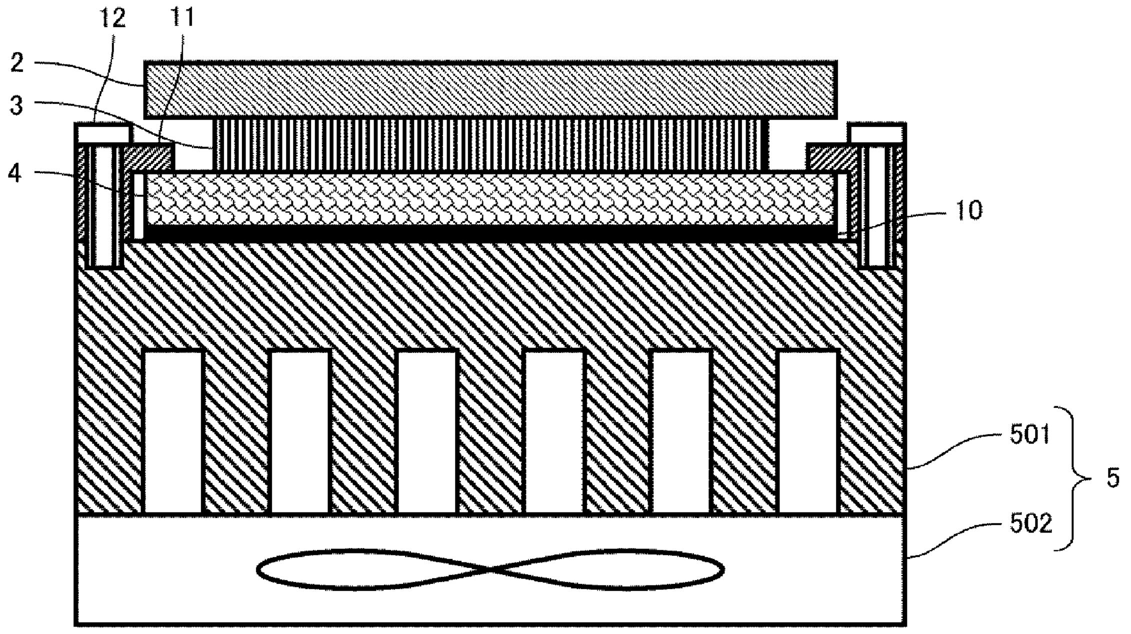
FIG. 9 is a sectional view illustrating an outline of a configuration in which the temperature control block is fixed in the thermal cycler according to the related art.

FIG. 9 is a sectional view illustrating an outline of a configuration in which the temperature control block 2 is fixed in the thermal cycler 30 according to the related art and corresponding to the line B-B of FIG. 1.

In the thermal cycler 30 according to the related art, the insulating substrate 4A, the thermoelectric conversion unit 3, and the insulating substrate 4B configure a thermoelectric conversion module. The temperature control block 2, the thermoelectric conversion module, and the heat radiating unit 5 are each independent components. It is necessary to fix two temperature control block 2 and thermoelectric conversion module when fixed to the heat radiating unit 5.

In the thermal cycler 30 according to the related art, the thermoelectric conversion module is fixed to the heat radiating unit 5 by a fixing member 11 with the thermoelectric conversion module interposed between the temperature control block 2 and the heat radiating unit 5. By performing the fixing with appropriate force, contact thermal resistances between the temperature control block 2 and the insulating substrate 4A and between the insulating substrate 4B and the heat radiating unit 5 are reduced. That is, the fixing member 11 contacts with the temperature control block 2 and the heat radiating unit 5. For example, when the reaction liquid is heated at a high temperature, a temperature of the temperature control block 2 is high and a temperature of the heat radiating unit 5 is low. Therefore, a heat conduction and transfer path is formed from the temperature control block 2 to the heat radiating unit 5 via the fixing member 11. Therefore, in the thermal cycler 30 according to the related art, a heat loss occurs in the heat conduction and transfer path between the temperature control block 2 and the heat radiating unit 5 due to the fixing member 11. The heat loss obstructs efficient and rapid heating and cooling of the reaction liquid 102.

Figure 10:
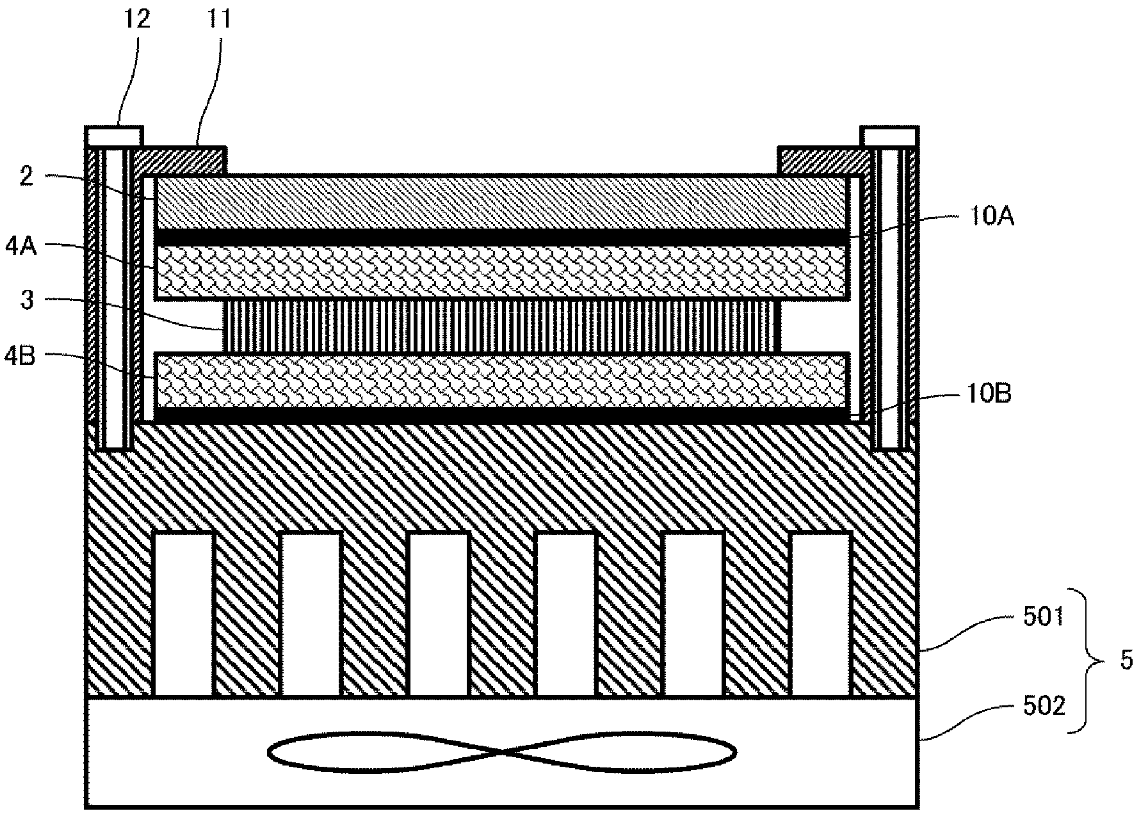
FIG. 10 is a sectional view illustrating an outline of a configuration in which the temperature control block is fixed in the thermal cycler according to the embodiment of the invention.

FIG. 10 is a sectional view illustrating an outline of a configuration in which the temperature control block 2 is fixed in the thermal cycler 20 according to the embodiment of the invention and corresponding to the line B-B of FIG. 1. In the thermal cycler 20 according to the embodiment, as described above, the temperature control block 2, the thermoelectric conversion unit 3, and the insulating substrate 4 configure a temperature control module. The temperature control module is a component independent from the heat radiating unit 5.

The insulating substrate 4 of the temperature control module is fastened and fixed to the heat radiating member 501 of the heat radiating unit 5 by, for example, the fixing member 11 and a fixing screw 12. The fixing member 11 contacts with the insulating substrate 4, the heat radiating unit 5, and the fixing screw 12 for fastening. The fixing member 11 does not fasten the temperature control block 2 and the heat radiating unit 5. That is, the fixing member 11 does not contact with the temperature control block 2 and does not form the heat conduction and transfer path via the fixing member 11 between the temperature control block 2 and the heat radiating unit 5. Since the temperature control block 2 and the thermoelectric conversion unit 3 are configured to be joined, it is not necessary to perform the fixing by the fixing member 11 from the temperature control block 2 as in the thermal cycler 30 according to the related art.

Therefore, in the thermal cycler 20 according to the embodiment, a heat loss caused in the heat conduction and transfer path between the temperature control block 2 and the heat radiating unit 5 by the fixing member 11 does not occur, and thus the reaction liquid 102 can be heated or cooled efficiently and rapidly.

Figure 11:
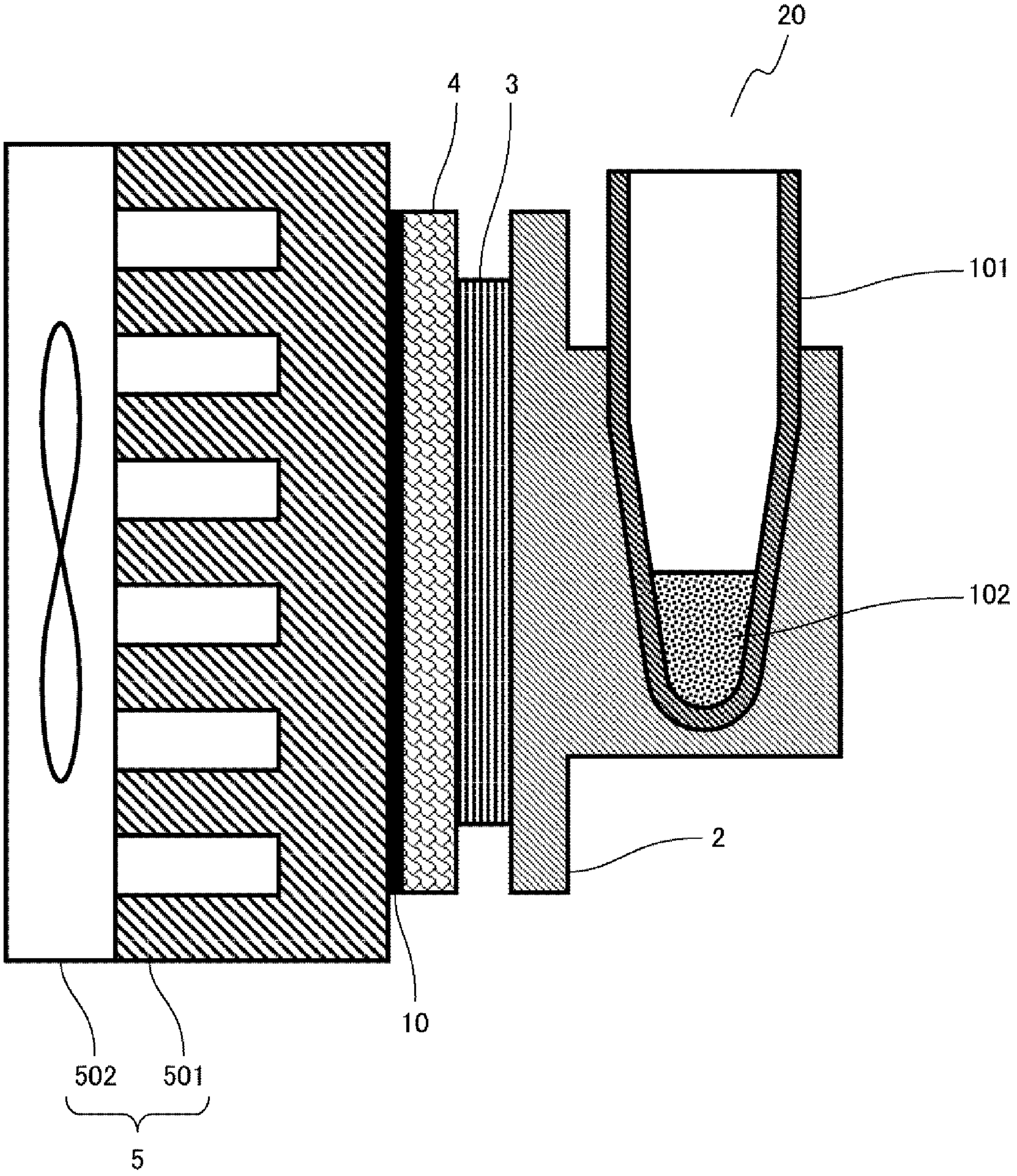
FIG. 11 is a sectional view illustrating an outline of another configuration of the thermal cycler according to the embodiment of the invention.

FIG. 11 is a sectional view illustrating an outline of another configuration of the thermal cycler 20 according to the embodiment of the invention. In the thermal cycler 20 illustrated in FIG. 11, constituent elements are arranged side by side in the horizontal direction.

In the terminal cycler 20 illustrated in FIG. 1, a direction of contact (the upper and lower directions of FIG. 1) with the thermoelectric conversion unit 3 of the temperature control block 2 is a depression direction of the recessed portion 1 of the temperature control block 2. That is, the direction is the same as the installation direction of the reaction vessel 101, and is a vertical direction.

In the thermal cycler 20 illustrated in FIG. 11, a direction of contact (the right and left directions of FIG. 5) with the thermoelectric conversion unit 3 of the temperature control block 2 is a depression direction (the upper and lower directions of FIG. 5) of the recessed portion 1 of the temperature control block 2. That is, the direction is different from the installation direction (vertical direction) of the reaction vessel 101, and is a horizontal direction.

In the thermal cycler 20 according to the embodiment, the temperature control block 2, the thermoelectric conversion unit 3, the insulating substrate 4, and the heat radiating unit 5 may be arranged side by side in the vertical direction, as illustrated in FIG. 1 or may be arranged side by side in the horizontal direction, as illustrated in FIG. 11. In the temperature control block 2, the upward recessed portion 1 where depression extends in the vertical direction is installed so that the reaction vessel 101 is installed.

Figure 12:
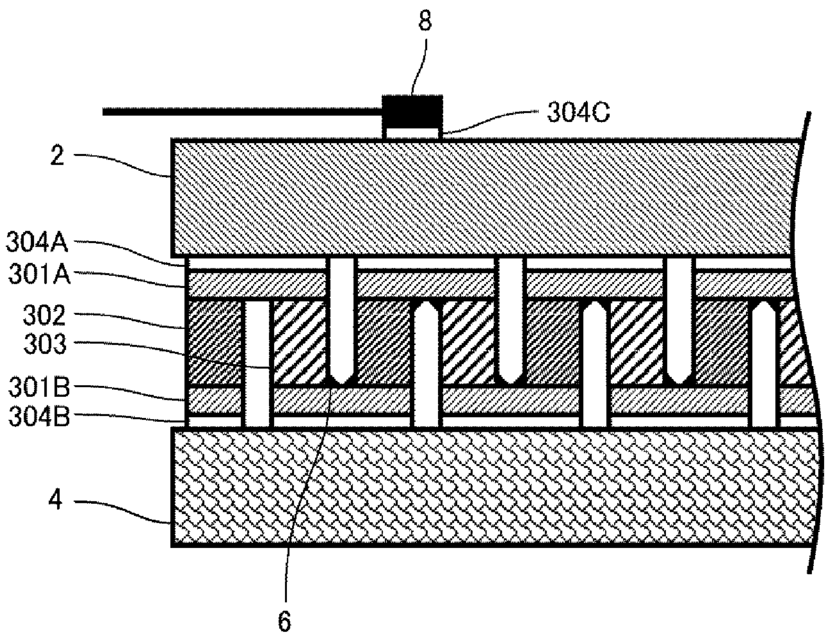
FIG. 12 is a sectional view illustrating an outline of a configuration in which a temperature sensor is fixed in the thermal cycler according to the embodiment of the invention.

FIG. 12 is a sectional view illustrating an outline of a configuration in which the temperature sensor 8 is fixed in the thermal cycler 20 according to the embodiment of the invention. Since a value of a current or a voltage applied to the thermoelectric conversion unit 3 is adjusted according to an output of the temperature sensor 8, it is necessary to measure a temperature of the temperature control block 2.

Figure 13:
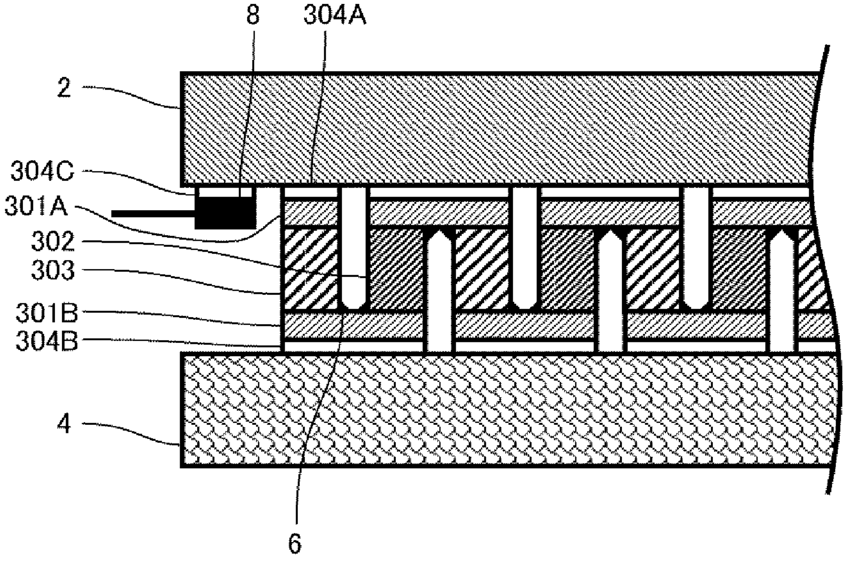
FIG. 13 is a sectional view illustrating an outline of another configuration in which the temperature sensor is fixed in the thermal cycler according to the embodiment of the invention.

In many cases, in the thermal cycler 30 according to the related art, as illustrated in FIG. 4, the temperature sensor 8 is fixed in a screw hole or the like provided in the temperature control block 2 by a fixing screw, or the temperature sensor 8 is inserted and fixed into a small hole provided in the temperature control block 2. On the other hand, in the thermal cycler 20 according to the embodiment, when the temperature control block 2 is formed of ceramics such as aluminum nitride, it may be difficult to process the screw hole or the small hole. In the thermal cycler 20 according to the embodiment, a metal plated layer 304C is applied to the opposite surface to the thermoelectric conversion unit 3 of the temperature control block 2 and the temperature sensor 8 is mounted on the metal plated layer 304C. FIG. 13 is a sectional view illustrating an outline of another configuration in which the temperature sensor 8 is fixed in the thermal cycler 20 according to the embodiment of the invention. As in FIG. 13, the number of times a metal plated process is processed using the installation position of the temperature sensor 8 as the surface of the temperature control block 2 on the side of the thermoelectric conversion unit 3 may be reduced. According to the method, the temperature sensor 8 can be fixed to the temperature control block 2 formed of ceramics such as aluminum nitride for which it is difficult to process the screw hole or the small hole.

As the temperature sensor 8, for example, a thermocouple, a thermistor, a platinum resistance temperature detector, or the like is used.

Figure 14:
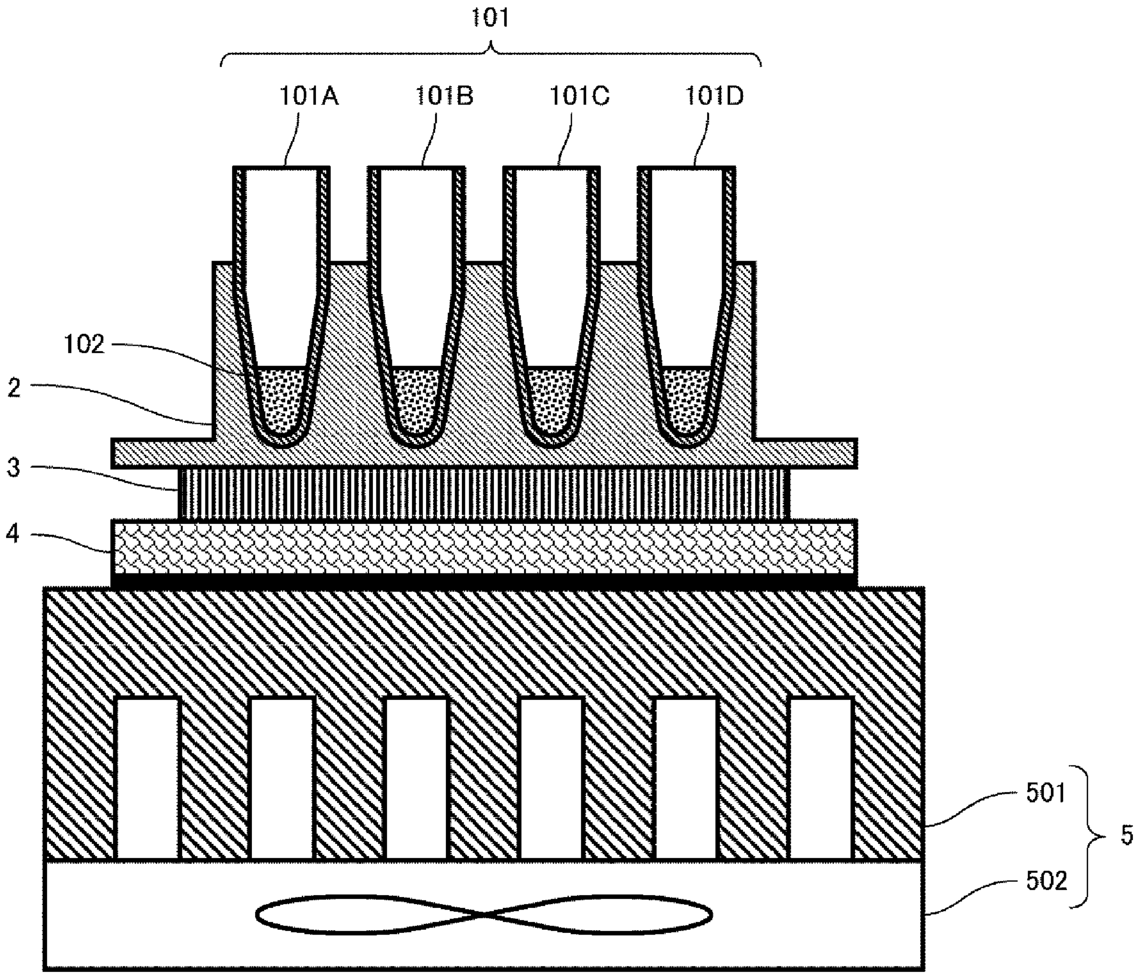
FIG. 14 is a sectional view illustrating an outline of a configuration of the thermal cycler that simultaneously heats or cools a plurality of reaction vessels according to the embodiment of the invention.

FIG. 14 is a sectional view illustrating an outline of a configuration of the thermal cycler 20 that simultaneously heats or cools the plurality of reaction vessels 101 according to the embodiment of the invention. In the thermal cycler 20 according to the embodiment, the temperature control block 2 includes the plurality of recessed portions 1 where the reaction vessels 101 can be installed and simultaneously heat or cool the reaction liquids 102 stored in the plurality of reaction vessels 101 to amplify nucleic acids efficiently.

Figure 15:
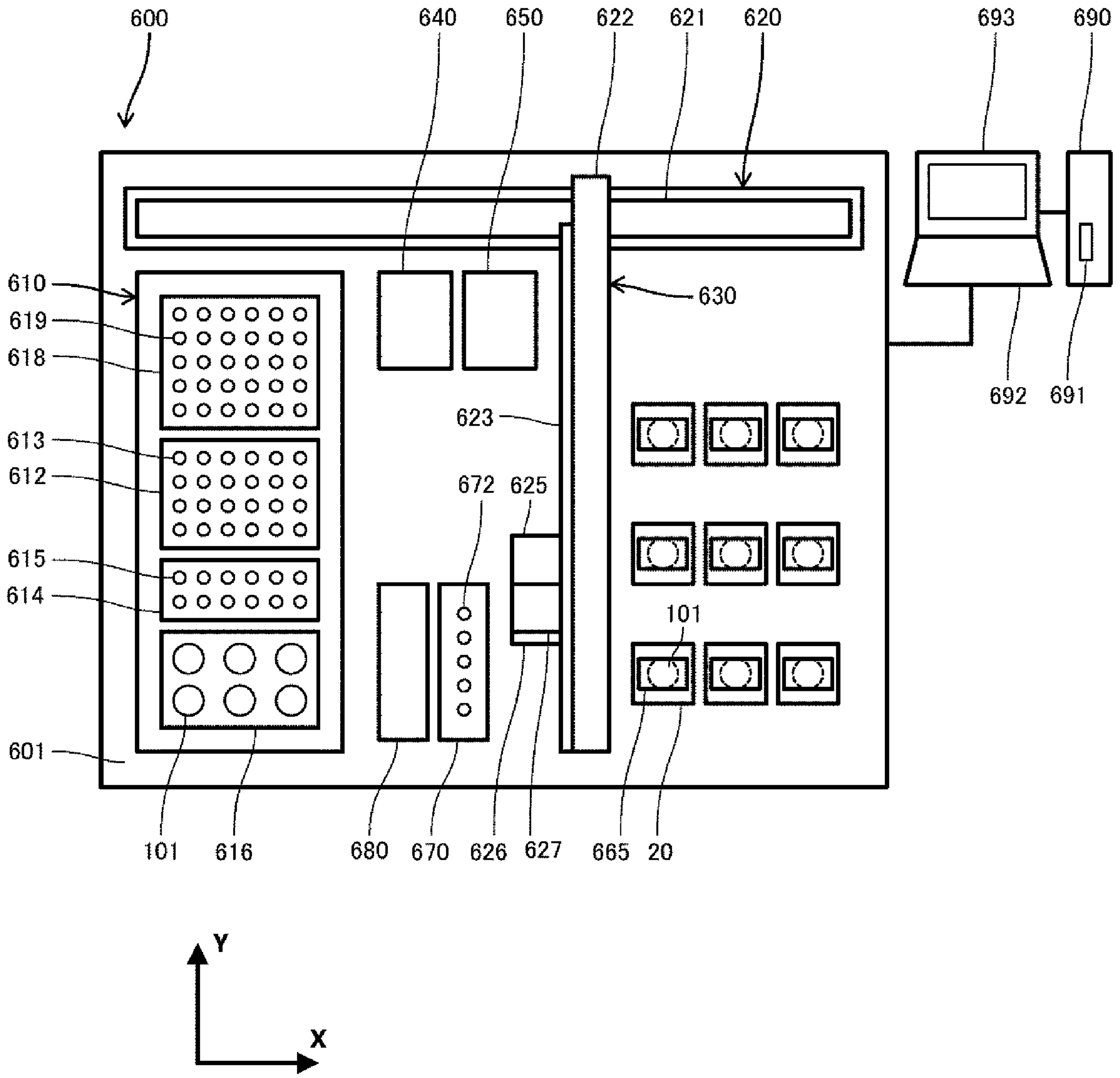
FIG. 15 is a diagram illustrating a configuration of a genetic inspection apparatus according to the embodiment of the invention.

In an embodiment of a genetic inspection apparatus 600 illustrated in FIG. 15, a rack mounting unit 610, a transport mechanism 620, a liquid dispensing mechanism 630, a lid unit 640, a stirring unit 650, a control device 690, the thermal cycler 20, and a measurement unit 665 are included.

In the genetic inspection apparatus 600, a liquid preparation unit that generates the reaction liquids 102 includes a rack mounting unit 110, a transport mechanism 120, a liquid dispensing mechanism 130, and a lid unit 140.

In the rack mounting unit 610, a sample, a reagent, a dispensing tip, and the reaction vessel 101 used for inspection are disposed. The rack mounting unit 610 is provided at a predetermined position on a work table 601 of the genetic inspection apparatus 600. A sample vessel rack 612, a reagent vessel rack 614, a reaction vessel rack 616, and a nozzle tip rack 618 are each mounted.

In the sample vessel rack 612, a plurality of sample vessels 613 that accommodate samples including nucleic acids which are amplification processing targets are stored. In the reagent vessel rack 614, the plurality of reagent vessels 615 accommodating reagents added to the samples are stored. In the reaction vessel rack 616, the plurality of unused empty reaction vessels 101 used to mix the samples and the reagents are stored. In the nozzle tip rack 618, a plurality of unused nozzle tips 619 used to dispense the samples and the reagents are stored.

The transport mechanism 620 is a mechanism that moves each spot in the genetic inspection apparatus 600 while holding the reaction vessel 101 or the like, includes an X axis direction guide 621, an X axis direction mover 622, a Y axis direction guide 623, and a Y axis direction mover 624, and is configured to move the Y axis direction mover 624 on the work table 601 based on a control signal so that the Y axis direction mover 624 can be disposed at a predetermined position on the work table.

The X axis direction guide 621 is a guide that extends in the X axis direction in FIG. 15 to be disposed on the work table 601 of the genetic inspection apparatus 600. The X axis direction mover 622 is a mover that is provided to be movable on the X axis direction guide 621.

The Y axis direction guide 623 is a guide that is attached and integrated with the X axis direction mover 622 and extends in the Y axis direction in FIG. 15 to be disposed. The Y axis direction mover 624 is a mover that is provided to be movable on the Y axis direction guide 623.

The Y axis direction mover 624 includes a barcode reader 625, a gripper unit 626, and a dispensing unit 627 which are moved integrally with the Y axis direction mover 624 on the work table 601 to be disposed at a predetermined position.

The barcode reader 625 reads identification information attached to each of the sample vessel 613, the reagent vessel 615, and the reaction vessel 101 to acquire the identification information.

The gripper unit 626 grips or releases the reaction vessel 101 in response to an operation of a gripper based on a control signal and transports the reaction vessel 101 in association with movement of the Y axis direction mover 624 between the units of the apparatus on the work table 601.

The dispensing unit 627 is configured so that the nozzle tip 619 can be attached and detached, the nozzle tip 619 is mounted from the nozzle tip rack 618 based on a control signal, the nozzle tip 619 is immersed into a sample inside the sample vessel 613 or a reagent inside the reagent vessel 615, and the sample or the reagent is sucked and picked into the nozzle tip 619. The dispensing unit 627 ejects and dispenses the sample or the reagent stored inside the nozzle tip 619 into the reaction vessel 101 based on a control signal.

The dispensing unit 627 is a main unit of the liquid dispensing mechanism 630 which is a mechanism dispensing the sample and the reagent using the dispensing tip inside one selected reaction vessel 101 and preparing the reaction liquid.

In the genetic inspection apparatus 600, a reaction liquid preparation position 670 is formed at which the unused reaction vessel 101 extracted from the reaction vessel rack 616 to prepare the reaction liquid is placed on the work table 601 between the rack mounting unit 610 and the thermal cycler 20.

At the reaction liquid preparation position 670, a vessel mounting unit 672 holding the reaction vessel 101 is provided. In the genetic inspection apparatus 600, the dispensing unit 627 is used to dispense the sample and the reagent from the sample vessel 613 and the reagent vessel 615 with respect to the unused reaction vessel 101 moved to the reaction liquid preparation position 670 from the reaction vessel rack 616 using the gripper unit 626, and to prepare the reaction liquid in which the sample and the reagent are mixed inside the reaction vessel 101. The plurality of vessel mounting unit 672 are included. Accordingly, for example, the same sample and the same reagent can be dispensed to the plurality of reaction vessels 101 together and batch processing can be performed en bloc to prepare the plurality of reaction liquids.

The lid unit 640 is a mechanism that serves as a lid of the reaction vessel 101 that accommodates the reaction liquid, and is a lid for an opening of the reaction vessel 101 that accommodates the reaction liquid and is moved from the reaction liquid preparation position 670 using the gripper unit 626. The lid unit 640 prevents evaporation of the reaction liquid, intrusion of foreign matters from the outside, or the like.

The stirring unit 650 is a mechanism that uniformly mixes the sample and the reagent of the reaction liquid accommodated in the reaction vessel 101, stirs the reaction liquid accommodated in the hermetic reaction vessel 101 moved from the lid unit 640 using the gripper unit 626, and mixes the sample and the reagent.

In the illustrated genetic inspection apparatus 600, the used nozzle tip 619 which is mounted on the dispensing unit 627 and is used to dispense the sample or the reagent, or a discarding box 680 for discarding the inspected reaction vessel 101 subjected to the nucleic acid amplification process by the thermal cycler is provided on the work table 601 between the reaction liquid reparation position 670 and the rack mounting unit 610.

The stirred reaction vessel 101 is mounted on the thermal cycler 20 and the nucleic acids of the reaction liquid are amplified according to a predetermined protocol.

The measurement unit 665 is disposed above the reaction vessel 101 holding the reaction liquid and measures density of the nucleic acid by measuring a fluorescent property of the reaction liquid of which a temperature has been adjusted according to the predetermined protocol by the thermal cycler 20.

The measurement unit 665 includes an excitation light source that irradiates a vessel portion of an exposed bottom side of the facing reaction vessel 101 with excitation light and a detection element that detects fluorescence from the reaction liquid based on the irradiation of the excitation light. As the excitation light source, for example, a light emitting diode (LED), a semiconductor laser, a xenon lamp, a halogen lamp, or the like is used. As the detection element, a photodiode, a photo-multiplier, a CCD, or the like is used.

Accordingly, the measurement unit 665 measures a quantity of a base sequence of an amplification target marked with fluorescence by the reagent in the reaction liquid by causing the detection element to detect and measure fluorescence generated from the reaction liquid through irradiation of the excitation light from the excitation light source.

An operation of each unit of the apparatus including the thermal cycler 20 of the genetic inspection apparatus 600 that has such a configuration is controlled by the control device 690 including an input device 692 such as a keyboard or a mouse, and a display device 693 such as a liquid crystal monitor.

The control device 690 controls each unit of the above-described apparatus including the thermal cycler 20 of the genetic inspection apparatus 600 and performs a nucleic acid inspection process including a reaction liquid preparation process and a nucleic acid amplification process using various types of software stored in advance in a storage unit 691 based on a protocol set by the input device 692. The control device 690 stores an operation status or the like of each unit of the apparatus in the nucleic acid inspection process in the storage unit 691, stores an analysis result such as a fluorescence detection result obtained by the thermal cycler 20 in the storage unit 691, and displays the analysis result on the display device 693.

The control device 690 according to the embodiment is configured to control temperatures of the plurality of thermal cyclers 20 independently in parallel.

Next, the above-described reaction liquid preparation process and nucleic acid amplification process will be described in detail with regard to the nucleic acid inspection process performed by the control device 690.

Here, the reaction liquid preparation process is a process of preparing a reaction liquid in which the sample and the reagent are dispensed in the reaction vessel 101 in the nucleic acid inspection process performed by the control device 690 of the genetic inspection apparatus 600. The nucleic acid amplification process is a process of causing the thermal cycler 20 to adjust a temperature of the reaction liquid prepared in the reaction vessel 101 through the reaction liquid preparation process by a protocol according to a type of base sequence of an amplification target and amplifying the nucleic acid of the base sequence while checking the nucleic acid through fluorescence measurement of the reaction liquid by the measurement unit 665.

The control device 690 first initializes various work areas used for the reaction liquid preparation process and provided in the storage unit 691 when the reaction liquid preparation process starts.

When the initialization related to the reaction liquid preparation process ends, the control device 690 performs a process of reading sample vessel rack information and reagent vessel rack information set by the input device 692 or execution content information of the nucleic acid inspection.

The control device 690 selects and extracts one or a plurality of individual nucleic acid processes to perform the reaction liquid preparation process at present time based on an order set in advance in one or a plurality of individual nucleic acid inspection processes included in the execution content information of the nucleic acid inspection.

Subsequently, at the reaction liquid preparation position 670, the control device 690 prepares the reaction liquid by controlling an operation of the liquid dispensing mechanism 630 based on reaction liquid preparation processing information of the selected and extracted individual nucleic acid process with regard to the unprocessed reaction vessel 101 transported in advance from the reaction vessel rack 616 and mounted on the vessel mounting unit 672 of the reaction liquid preparation position 670.

The thermal cycler 20 and the genetic inspection apparatus 600 according to the embodiment can heat or cool the reaction liquid rapidly and efficiently, as described above. It is possible to provide a thermal cycler that has a long device lifespan, and a genetic inspection apparatus including the thermal cycler.

The invention is not limited to the foregoing embodiment and can be modified in various forms. For example, the foregoing embodiment has been described in detail to easily understand the invention. The invention is not limited to aspects in which all the described configurations are not necessarily included. Some of configurations of a certain embodiment can replaced with configurations of another embodiment. To configurations of a certain embodiment, configurations of another embodiment can also be added. For some of the configurations of a certain embodiment, a configuration can be deleted or another configuration may be added or replaced.

REFERENCE SIGNS LIST

1 Recessed portion
2 Temperature control block
3 Thermoelectric conversion unit
4, 4A, 4B Insulating substrate
5 Heat radiating unit
6 Solder
7A, 7B Lead wire
8 Temperature sensor
10A, 10B Thermal interface material
11 Fixing member
12 Fixing screw
20 Thermal cycler
30 Thermal cycler according to related art
101 Reaction vessel
102 Reaction liquid
301A, 301B, 301C Electrode
302 P-type semiconductor element
303 N-type semiconductor element
304A, 304B, 304C Metal plated layer
501 Heat radiating member
502 Blower
600 Genetic inspection apparatus
601 Work table
610 Rack mounting unit
612 Sample vessel rack
613 Sample vessel
614 Reagent vessel rack
615 Reagent vessel
616 Reaction vessel rack
618 Nozzle tip rack
619 Nozzle tip
620 Transport mechanism
621 X axis direction guide
622 X axis direction mover
623 Y axis direction guide
624 Y axis direction mover
625 Barcode reader
626 Gripper unit
627 Dispensing unit
630 Liquid dispensing mechanism
640 Lid unit
650 Stirring unit
665 Measurement unit
670 Reaction liquid preparation position
672 Vessel mounting unit
680 Discarding box
690 Control device
691 Storage unit
692 Input device
693 Display device

The invention claimed is:

1. A thermal cycler comprising:

a temperature adjustment block including one or more recessed portions configured such that a reaction vessel storing a reaction liquid in which a sample and a reagent are mixed is installable;

a thermoelectric conversion unit capable of performing heating and cooling;

a temperature sensor configured to measure a temperature of the temperature adjustment block;

an insulating substrate configured such that one surface contacts with the thermoelectric conversion unit; and a heat radiating unit provided on the other surface of the insulating substrate and configured to discharge heat of the thermoelectric conversion unit to the outside, wherein a current or a voltage supplied to the thermoelectric conversion unit is controlled based on the temperature of the temperature adjustment block measured by the temperature sensor to heat and cool the temperature adjustment block, the thermoelectric conversion unit includes a P-type semiconductor element, an N-type semiconductor element, and an electrode electrically connecting the P-type semiconductor element to the N-type semiconductor element, and the thermoelectric conversion unit is sandwiched to contact with the temperature adjustment block and the insulating substrate, and the temperature adjustment block is formed of aluminum nitride and is installed to contact with the electrode of the thermoelectric conversion unit.

2. The thermal cycler according to claim 1, wherein the temperature adjustment block includes the plurality of recessed portions and is able to simultaneously heat and cool the plurality of reaction vessels.

3. The thermal cycler according to claim 1, wherein the insulating substrate and the heat radiating unit are fastened by a fixing member and the fixing member does not directly contact with the temperature adjustment block.

4. The thermal cycler according to claim 1, wherein the temperature sensor is soldered and fixed to a metal plated layer provided on a surface of the temperature adjustment block.

5. A genetic inspection apparatus comprising:

the thermal cycler according to claim 1; and a measurement unit configured to measure a fluorescent property of a reagent solution of which a temperature is adjusted by the thermal cycler.

6. The genetic inspection apparatus according to claim 5, wherein the measurement unit is disposed above the reaction vessel holding the reagent solution.

7. The genetic inspection apparatus according to claim 5, further comprising:

a liquid preparation unit configured to generate the reaction liquid.

8. The genetic inspection apparatus according to claim 6, further comprising:

a liquid preparation unit configured to generate the reaction liquid.

9. A thermal cycler comprising:

a temperature adjustment block including one or more recessed portions configured such that a reaction vessel storing a reaction liquid in which a sample and a reagent are mixed is installable;

a thermoelectric conversion unit capable of performing heating and cooling;

a temperature sensor configured to measure a temperature of the temperature adjustment block;

an insulating substrate configured such that one surface contacts with the thermoelectric conversion unit; and a heat radiating unit provided on the other surface of the insulating substrate and configured to discharge heat of the thermoelectric conversion unit to the outside, wherein a current or a voltage supplied to the thermoelectric conversion unit is controlled based on the temperature of the temperature adjustment block measured by the temperature sensor to heat and cool the temperature adjustment block, the thermoelectric conversion unit includes a P-type semiconductor element, an N-type semiconductor element, and an electrode electrically connecting the P-type semiconductor element to the N-type semiconductor element, and the thermoelectric conversion unit is sandwiched to contact with the temperature adjustment block and the insulating substrate, and the temperature adjustment block is formed of boron nitride and is installed to contact with the electrode of the thermoelectric conversion unit.

* * * * *